United States Patent
Panosian et al.

(10) Patent No.: US 11,719,535 B1
(45) Date of Patent: Aug. 8, 2023

(54) MASONRY LEVEL

(71) Applicants: Michael H Panosian, Irvine, CA (US); Joshua M Keeler, Irvine, CA (US)

(72) Inventors: Michael H Panosian, Irvine, CA (US); Joshua M Keeler, Irvine, CA (US)

( * ) Notice: Subject to any disclaimer, the term of this patent is extended or adjusted under 35 U.S.C. 154(b) by 0 days.

(21) Appl. No.: 18/095,017

(22) Filed: Jan. 10, 2023

(51) Int. Cl.
*G01C 9/26* (2006.01)

(52) U.S. Cl.
CPC ..................... *G01C 9/26* (2013.01)

(58) Field of Classification Search
CPC .................... G01C 9/26; G01C 9/28
USPC .................... 33/370, 372, 373, 381
See application file for complete search history.

(56) References Cited

U.S. PATENT DOCUMENTS

| | | | | |
|---|---|---|---|---|
| 3,826,013 | A * | 7/1974 | Baher | G01C 9/24 D10/69 |
| 4,168,578 | A * | 9/1979 | VanderWerf | G01C 9/28 33/382 |
| 4,852,320 | A * | 8/1989 | Ballantyne | E04B 1/4178 52/379 |
| 4,944,094 | A * | 7/1990 | Depiano | G01C 9/26 33/332 |
| 5,799,404 | A * | 9/1998 | Payne | F16M 13/022 33/372 |
| 6,915,588 | B1 * | 7/2005 | Gay | G01C 9/28 33/485 |
| 6,918,187 | B2 * | 7/2005 | Schaefer | G01C 9/26 33/383 |
| 7,150,107 | B2 * | 12/2006 | Kim | G01C 9/28 33/365 |
| 7,204,029 | B2 * | 4/2007 | Tran | G01C 9/26 33/379 |
| 7,243,435 | B2 * | 7/2007 | Morrissey | G01C 9/28 33/379 |
| 7,360,316 | B2 * | 4/2008 | Hoover | G01C 9/28 33/379 |
| 7,770,298 | B1 * | 8/2010 | Wojciechowski | G01C 9/26 33/739 |
| 7,797,853 | B2 * | 9/2010 | Compton | A47G 1/205 33/666 |
| 10,709,279 | B1 * | 7/2020 | Hammer | A47H 1/142 |
| 11,193,763 | B1 * | 12/2021 | Panosian | G01C 9/34 |
| 11,255,667 | B1 * | 2/2022 | Panosian | G01C 9/28 |
| 11,415,413 | B2 * | 8/2022 | Cook | G01C 9/34 |
| 11,547,223 | B1 * | 1/2023 | Hassett | G01C 9/34 |

(Continued)

*Primary Examiner* — George B Bennett
(74) *Attorney, Agent, or Firm* — Farjam Majd; Arjomand Law Group, PLLC

(57) ABSTRACT

A masonry level, with an extruded metallic box main body, is disclosed for measuring orientation of a work surface. The front of the main body includes an external longitudinal lower floating fin protrusion and a mid-section longitudinal tab and an upper longitudinal hook tab. The main body further includes an internal longitudinal tab in the back and multiple apertures for installation of eyelets for hanging the level, side bubble vials at the ends of the main body and a central horizontal bubble vial. The main body has a wider bottom relative to its top, and has a longitudinal upper back convex shape. A number of plastic claddings are attached to the front of the masonry level. Endcaps are attached to the ends of the main body structure. The masonry level can also be used as a construction tool to smooth uncured concrete and mud plaster surfaces.

20 Claims, 7 Drawing Sheets

(56) References Cited

U.S. PATENT DOCUMENTS

2013/0283625 A1* 10/2013 Sullivan .................. G01C 9/28
33/371

* cited by examiner

MASONRY LEVEL

TECHNICAL FIELD

This application relates generally to a level device used for measuring orientation of a work surface. More specifically, this application relates to a level device used in construction applications where orientation of a work surface made from masonry products, such as concrete and stone, is measured and level device comes in contact with uncured concrete and maybe used to smooth out the concrete and perform other rough tasks normally not done with regular level devices.

BRIEF DESCRIPTION OF THE DRAWINGS

The drawings, when considered in connection with the following description, are presented for the purpose of facilitating an understanding of the subject matter sought to be protected.

DETAILED DESCRIPTION

Figure 1:
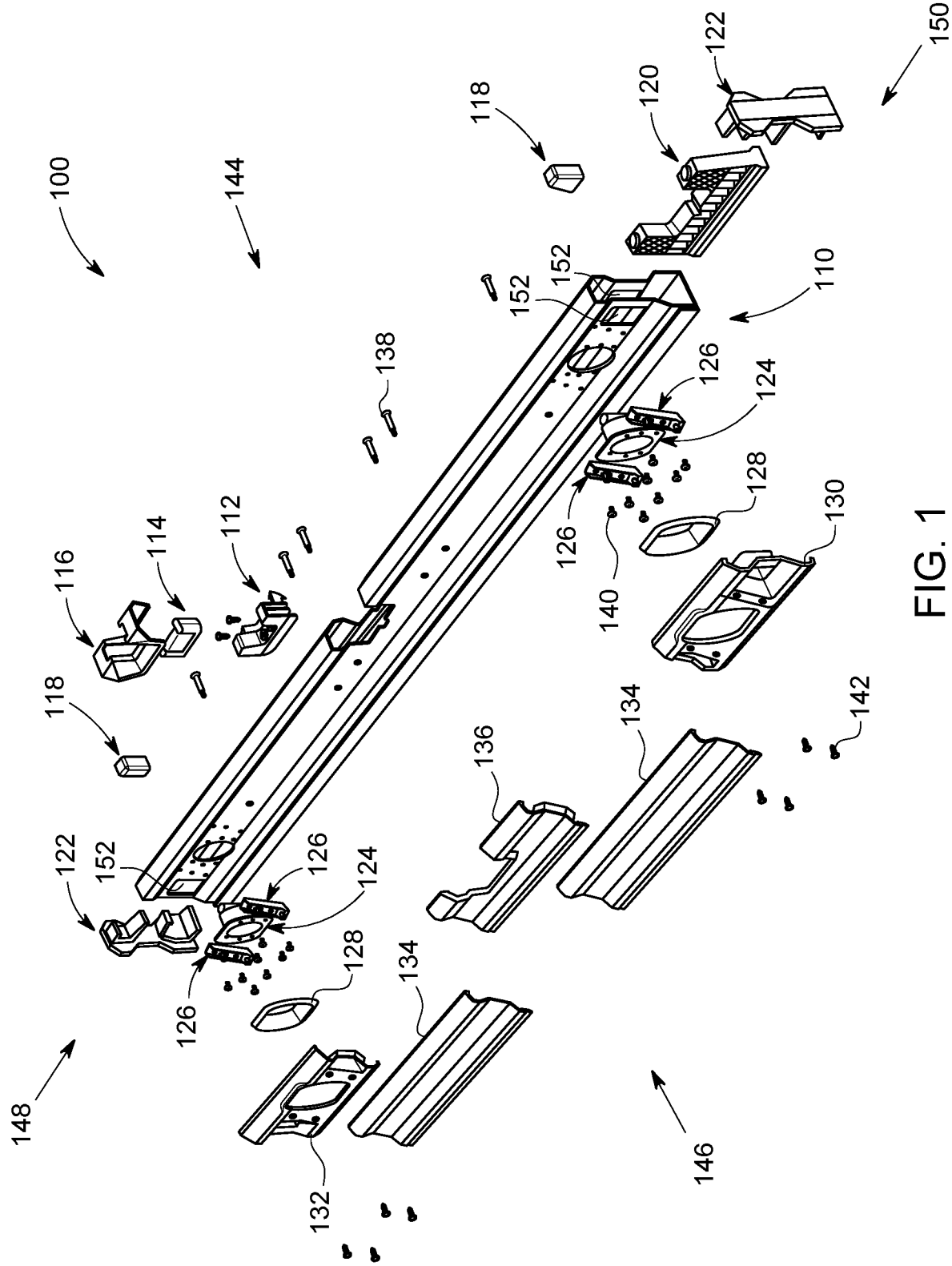
FIG. 1 shows an example masonry level exploded view.

While the present disclosure is described with reference to several illustrative embodiments and example devices described herein, it should be clear that the present disclosure should not be limited to such embodiments. Therefore, the description of the embodiments provided herein is illustrative of the present disclosure and should not limit the scope of the disclosure as claimed. In addition, while following description references particular configurations of a masonry level device, it will be appreciated that the disclosure may be applicable with other types of level device configurations.

Briefly described, a system and a method are disclosed including a masonry level device similar to a spirit level device used for measuring orientation of a work surface. The disclosed masonry level is in particular designed to have additional features enabling the masonry level device to be used in construction industry in applications where a harsh environment exists and the masonry level device comes in contact with rough surfaces such as masonry and multiple contaminants including construction debris, uncured and cured concrete, uncured and cured mud plaster and plaster, glues, and sharp tool edges. The present disclosed masonry level not only is used as a precision orientation measuring device, it also may be used as a concrete hand float, concrete or plaster spreader, a concrete screed edge to smooth out uncured concrete surfaces as it stands alone or in the process of laying bricks, or in application where plaster mud is applied to a surface to smooth out the plaster mud. The masonry level further may be used to enact minor impacting of masonry when laying bricks or stone working. Minor impacts may be characterize as being strong enough to push or slide a brick on wet and unhardened mortar a fraction of an inch, such as ⅛ or ¼ of an inch, without denting or doing any other damage to the body of the masonry level. The internal structure of the masonry level may be designed and configured to allow attachment of side plastic claddings, provide high-strength for the level's body against bending or other mechanical distortions, and support other components such as bubble vials, as further described bellow.

The disclosed masonry level in general includes one or more bubble vials coupled to the masonry level body and structure. The masonry level device's main structure is an elongated metallic extrusion with a box cross section with specific purposeful internal and external shape configurations. This is in contrast to an I-Beam structure which is commonly used on spirit level devices. A box cross-section may provide comparatively more structural strength, where the disclosed masonry level device is used as a construction tool in addition to its precision orientation measurement device application. The box extruded configuration has a wider base relative to its top enabling using the masonry level base as a surface smoothing tool and a convex shaped back wall upper side for ease of grasping and handling the masonry level. The box extruded configuration further includes an internal longitudinal tab for placement of an internal ancillary structure and external longitudinal protrusions including a longitudinal placement tab and a longitudinal hook tab and a longitudinal floating fin for placement and securing of external side plastic claddings coupled to the masonry level.

The disclosed masonry level further includes coupled placement structures or housing, bezel and bezel cover structures for attachment and coupling of bubble vials to the masonry level. These housings for the bubble vials are coupled to the masonry level structure both internal and external to the extruded metallic box of the masonry level. Furthermore, the disclosed masonry level includes one or more plastic cladding sections coupled to the front side wall for further holding in place of structures used for coupling of the bubble vials, and coverage of the front side of the masonry level. The masonry level has a relatively wide smooth bottom wall for placement on work surfaces for orientation measurement and also for smoothing of uncured concrete or mud plaster surfaces. The plastic material of the claddings will partly prevent attachment of uncured concrete and mud plaster to the plastic surface and makes it easier to clean the masonry level.

The disclosed masonry level may have eyelet structures coupled to the extruded box shape body of the masonry level to provide apertures at the end of the masonry level for hanging the masonry level on a tool wall. The masonry level further includes pressure-fit plastic endcaps coupled to the ends of the masonry level elongated metallic extruded structure to close the open ends of the masonry level to prevent entry of construction debris, uncured concrete and mud plaster inside the box shaped structure of the masonry level main structure.

In various embodiments, the masonry level may include an extruded metallic box main body, with an upper back side shaped in a longitudinal convex manner, a relatively wider bottom wall compared to a narrower top wall, and multiple bubble vials. The masonry level further includes multiple housing structures for placement of the bubble vials. The masonry level extruded structure further includes an external longitudinal floating fin as part of a front side of the main body, an external longitudinal tab and an external longitudinal hook tab as part of the front side of the main body. There is also an internal longitudinal tab as part of a back side of the main body. The masonry level further incudes multiple plastic claddings coupled to the front side of the main body, multiple eyelets coupled to the main body, and multiple endcaps coupled to the ends of the main body.

In various embodiments, a spirit level may include an extruded metallic box main body, with an upper back side shaped in a longitudinal convex manner, a relatively wider bottom wall compared to a narrower top wall. The upper back side longitudinal convex shape of the extruded main body includes an upper slanted curved wall, a middle straight wall, and a lower slanted wall. The main body further includes an external longitudinal floating fin as part of a lower front side of the main body, an external longitudinal tab proximate to a free end of the floating fin, and an external longitudinal hook tab on an upper front side of the main body, and an internal longitudinal tab as part of a back side of the main body.

In various embodiments, a method of making a masonry level may include using a masonry level including a extruded metallic box shape main body with an upper back side convex configuration and a bottom wall's width larger than an top wall's width. With the masonry level having multiple bubble vials, and further including several plastic claddings press fit coupled to the front of the masonry level. The plastic claddings are connected to the front of the masonry level using a gap between a lower straight side wall of the main body and a longitudinal floating fin at the lower front side of the main body, and an external longitudinal tab protrusion from the main body lower front proximate to the floating end of the floating fin and an external longitudinal hook tab protrusion at an upper end of the main body front side. The masonry level is used by placing a smooth surface of the masonry level's bottom wall on a work surface to be orientation measured.

Building contractors, construction crew, handy men, do-it-yourself enthusiasts, hobbyists and people who hang pictures on their home walls all benefit from using a level to measure orientation of a work surface, installing a door frame, or precision hanging of picture frames. There are different kinds of levels available in the market ranging from, plastic, metallic, or wood structure levels all the way to digital levels provided through a phone app providing a display screen-based simulation of a virtual bubble vial. Depending on the specific need for orientation measurement a multitude of mentioned levels can be used. However, in applications where the working environment is a harsh environment it is best to use a level that is made of a longer lasting material such as a metallic level. In some application in construction industry the requirements go beyond working in a harsh environment. It is common where construction crew tends to use the tools they have for other purposes beyond the usual utilization of the tool at hand. In such circumstances the tool needs to withstand the unintended application of the tool. In masonry work, the brick layer uses a level to make sure the bricks are laid consistent and in a horizontal manner. Furthermore, for smoothing the underlaying concrete or removing excess concrete between the brick edges, or for impacting a laid brick to fit in line with an adjacent brick it is convenient to use the same level as an available tool instead of getting a concrete hand float, a concrete spreader, or a concrete screed edge to smooth out uncured concrete surfaces, or a small mallet for impacting the brick. Such an unintended use of an ordinary metallic level that is only intended for precision orientation measurement ruins the level structurally both trough permanent deformation of the level or through attachment of concrete to the level. To alleviate issues with unintended use of a level, the present disclosed masonry level utilizes an extruded box configuration for the main body of the masonry level providing more structural stability as compared to an I-Beam structure. The masonry level further has plastic endcaps to prevent entry of uncured concrete and other construction debris inside the box structure. The masonry level further has external protrusions and side sections including longitudinal floating fin, longitudinal tab and longitudinal hook tabs for coupling of plastic cladding to the side of the main body to protect the precision bubble vials against impact and also the side of the masonry level against attachment of uncured concrete. The extruded main body of the masonry level further includes an internal longitudinal tab for positioning an internal housing structure used for installation of a horizontal bubble vial on the masonry level.

It is to be noted that for the purposes of clear description in this specification, the orientation of various parts, sections, or portions of the masonry level, such as multiple similar parts and directions like "up", "down", "front", "back", "left", "right", and the like, are specified with respect to certain features distinguishable from other features of the masonry level. More specifically, with reference to FIG. 1 and FIG. 2, further described below, front side of masonry level is indicated by reference number 146, the back side by 144, bottom by surface 202 and to by surface 204, left side by 148, and right side by 150. The longitudinal axis of the masonry level extends along the masonry level's length between the left side 148 and right side 150.

FIG. 1 shows an example masonry level exploded view. A Masonry level 100 exploded view is shown including an extruded metallic main body 110, a horizontal bubble vial housing structure 112, a horizontal bubble vial 114, a horizontal bubble vial upper cover 116, a set of eyelets 118, a horizontal bubble vial lower housing structure 120, a set of two endcaps 122, a set of two side bubble vials 124, multiple brackets 126, a bezel cover 128, a right side plastic cladding 130, a left side plastic cladding 132, a set of two intermediate plastic claddings 134, a center plastic cladding 136, multiple long screws 138, multiple rivets 140, multiple short screws 142, a masonry level back side 144, a masonry level front side 146, a masonry level left side 148, a masonry level right side 150, and multiple side apertures 152.

In various embodiments the masonry level 100 exploded view may include an extruded main body 110 in different shapes including a box shape, an I-Beam, a triangular, or a trapezoid configuration.

The illustrated bubble vials including the horizontal bubble vial 114 and associated horizontal bubble vial lower housing structure 120, horizontal bubble vial housing structure 112, horizontal bubble vial upper cover 116, and side bubble vials 124, and associated bezel cover 128 can have alternative angular orientations and shape configuration specific to their utilization in orientation measurement including vertical or slanted (angled with respect to a reference surface or line such as gravitational horizon) orientation.

The endcaps 122, which may be press fit at the end of the masonry level extruded box shape main body 110 to safeguard the ends of the main body 110 and also to prevent introduction of construction debris and uncured concrete into the extruded box shape can take on different shapes depending on the end section configuration of the level end and can be made of different material including plastic, metal or wood. The coupling of the endcaps to the end of the level may be through press fitting the endcap or using a fastener, glue, or snap in method.

The plastic claddings including the right-side plastic cladding 130, the left side plastic cladding 132, the set of two intermediate plastic claddings 134, and the center plastic cladding 136 may take different shapes, subdivided in more separate claddings and be made of different material including plastic, other polymers, metal, glass or wood depending on specific characteristics required for the claddings' purpose. The brackets 126 that are used for installation of the right-side plastic cladding 130 and the left side plastic cladding 132 can have different configurations and be made of different material such as metal, plastic and wood, and may be coupled to the main body 110 via rivets, fasteners, or glue.

The eyelets 118 in present disclosure are shaped like trapezoids with an internal aperture, coupled to the main body 110 via apertures 152 on the end sides on the main body, and are used for hanging the masonry level from a tool wall between uses. The eyelets 118, which are press fit coupled to the main body 110 can be coupled to the main body 110 via fasteners, or glue. The shape of the eyelets 118 can also be circular, semi-circular, closed curve shape, rectangular, square or any other multi sided shape. The eyelets 118 in the present disclosure are trapezoid-shape and are coupled to the main body 110 in a reverse format, where a trapezoidal base (longer one of the parallel sides) of a first eyelet 118 is substantially parallel with the bottom wall of the main body 110, and the trapezoidal base of a second eyelet 118 is substantially parallel with the top wall of the main body 110. The technical effect of the reverse coupling format of the eyelets 118 to the end of the main body 110 provides for a substantially similar hanging slant of the masonry level on a tool wall regardless of which end of the masonry level is hung from a hook.

Figure 2:
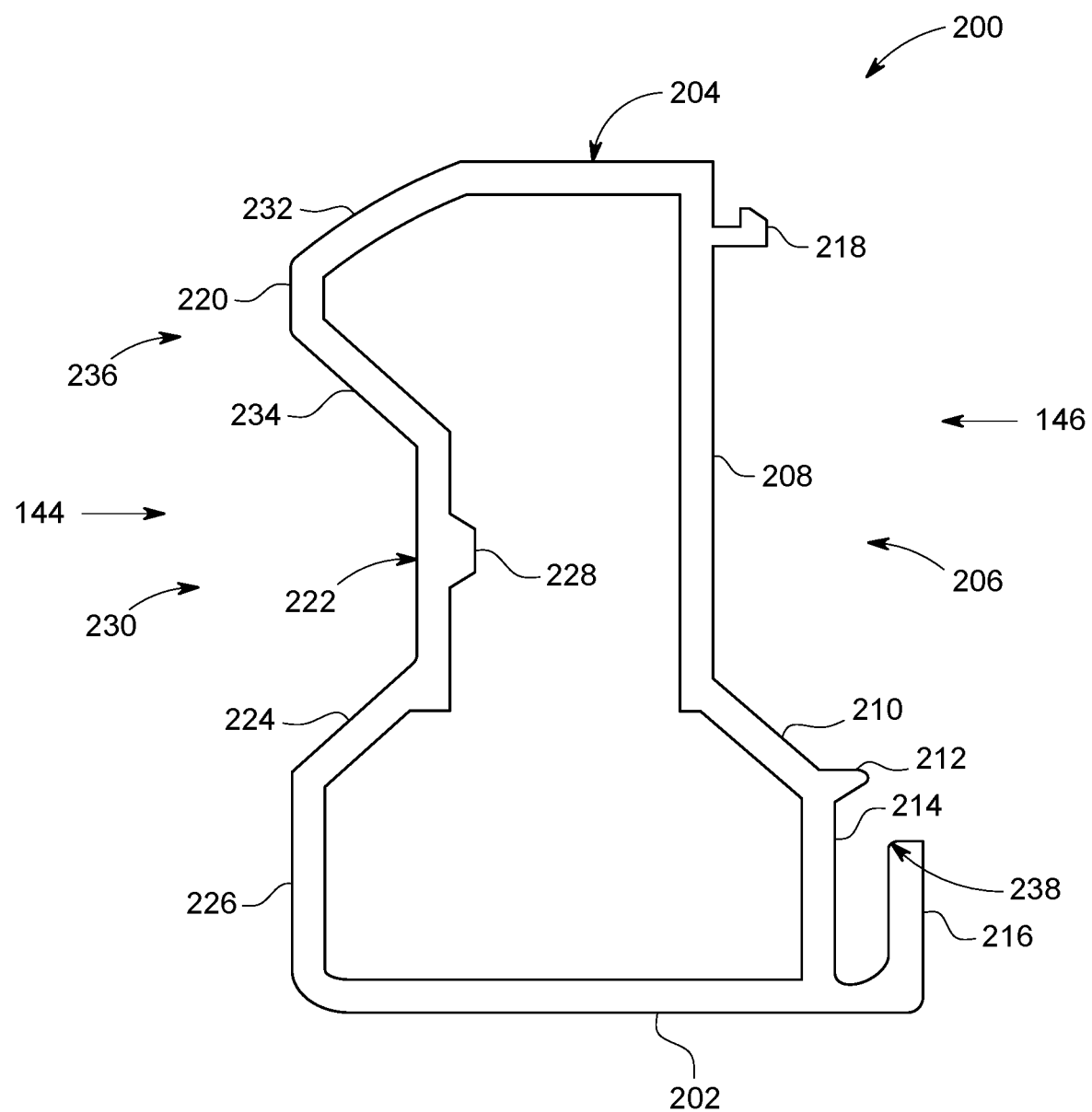
FIG. 2 shows the example masonry level extrusion cross section body of FIG. 1 masonry level.

FIG. 2 shows the example masonry level extrusion cross section body of FIG. 1 masonry level. The masonry level 100 extrusion left side 148 view cross section 200 is shown including an extruded box main body external bottom wall 202, an extruded box main body external top wall 204, an extruded box main body external front side surface 206, an extruded box main body external upper front straight wall 208, an extruded box main body external slanted front wall 210, an optionally longitudinal external tab 212, an extruded box main body external lower front straight wall 214, a longitudinal floating fin 216, an optionally longitudinal hook tab 218, an extruded box main body external back side middle straight wall of upper convex section 220, an extruded box main body external back side midsection straight wall 222, an extruded box main body external back side lower slanted wall 224, an extruded box main body external back side lower straight wall 226, an extruded box main body back side longitudinal internal tab 228, an extruded box main body external back side surface 230, an extruded box main body external back side upper slanted curved wall of upper convex section 232, an extruded box main body external back side lower slanted wall of upper convex section 234, an extruded box main body external back side upper convex section 236, a floating fin wall internal surface beveled or rounded edge corner 238. Furthermore, the illustrated view of the cross section 200 is from the left side 148 of the masonry level 100, and front side 146 of the masonry level 100, and back side 144 of the masonry level 100 are also identified.

The external longitudinal floating fin 216 as part of the lower front side 206 of the masonry level 100 is proximate to the extruded box main body external lower front straight wall 214 creating a gap between the lower front side wall of the masonry level 214 and the floating fin 216. The plastic claddings (not shown) coupled to the front side of the masonry level 100 use this gap and the external longitudinal tab 212 and the external longitudinal hook tab 218 for coupling to the masonry level 100. The internal upper edge of the floating fin 216 is in contact with the plastic claddings and the floating fin wall internal surface 238 is a filleted edge corner to prevent damage to the plastic cladding during installation of the claddings on the masonry level 100.

The bottom wall 202 of the masonry level 100 is wider, in comparison with the masonry level 100 top wall 204, providing a surface to be placed on a work surface to be orientation measured and further to be used for smoothing uncured concrete during masonry work.

In some embodiments, each of the external tab 212 and the hook tab 218 may be longitudinally oriented along the length of masonry level 100, but only cover a partial length (less than the whole length) of the masonry level 100. Each may cover a section along the length of the masonry level 100 and the sections covered by each may be different from each other. In still other embodiments, the external tab 212 and the hook tab 218 may not be longitudinally oriented, but still perform the same function of coupling with the plastic claddings. In some other embodiments, the masonry level 100 may have one of the external tab 212 and the hook tab 218, but not both.

The general box shape of the extruded main body provides for a structurally strong masonry level 100, rendering it capable to withstand minor impacting of masonry while laying bricks or stone working by construction workers, preventing permanent structural deformation of the masonry level. Furthermore, the extruded box main body back side longitudinal internal tab 228 not only provides structural strength, but it also provides structural support for installation of the horizontal bubble vial (not shown) that will be discussed further with respect to FIG. 3.

The convex section 236, forming the extruded box main body external upper back side of the masonry level 100, facilitates gripping of the masonry level 100 when the bottom wall 202 of the masonry level is used for smoothing uncured concrete or other non-orientation measurement use of the masonry level. The convex section 236 includes an upper slanted curved wall 232, a middle straight wall 220, and a lower slanted wall 234 forming the convex configuration. The convex configuration may have a continuous semi-circular shape or a parabola.

The lower slanted walls, including the external slanted front wall 210 and the external back side slanted wall 224, connected to the lower straight walls of the masonry level 100, including lower front straight wall 214 and back side lower straight wall 226, provide for the wider width of the bottom wall 202 of the masonry level 100 relative to the top wall 204 of the masonry level 100.

Figure 3:
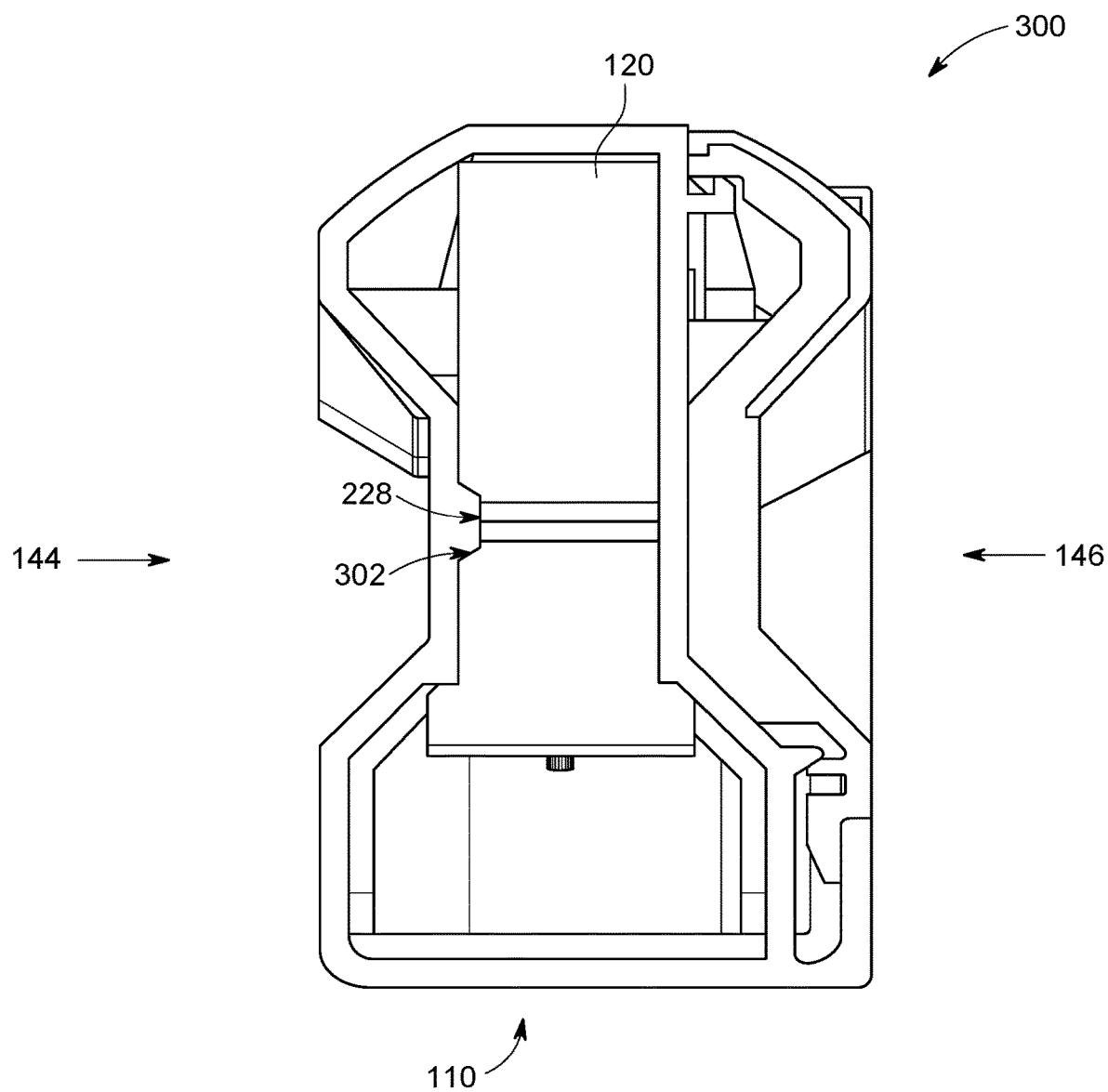
FIG. 3 shows an example cross section of the masonry level of FIG. 1.

As to the presented figures, FIG. 3 shows an example cross section of the masonry level of FIG. 1. The illustrated masonry level 100 left side 148 view cross section 300 further shows the horizontal bubble vial lower housing structure 120, a horizontal bubble vial, the lower housing structure back side longitudinal mid-section indentation 302, the extruded box main body back side longitudinal internal tab 228, the extruded metallic main body 110, identifying the masonry level back side 144, and the masonry level front side 146.

The horizontal bubble vial lower housing structure 120 is shown as coupled internally to the masonry level 100 extruded box main body 110, where the horizontal bubble vial lower housing structure back side longitudinal mid-section indentation 302 is fitting coupled with the extruded box main body back side longitudinal internal tab 228, providing a vertical and positioning support for the horizontal bubble vial lower housing structure 120.

Figure 4:
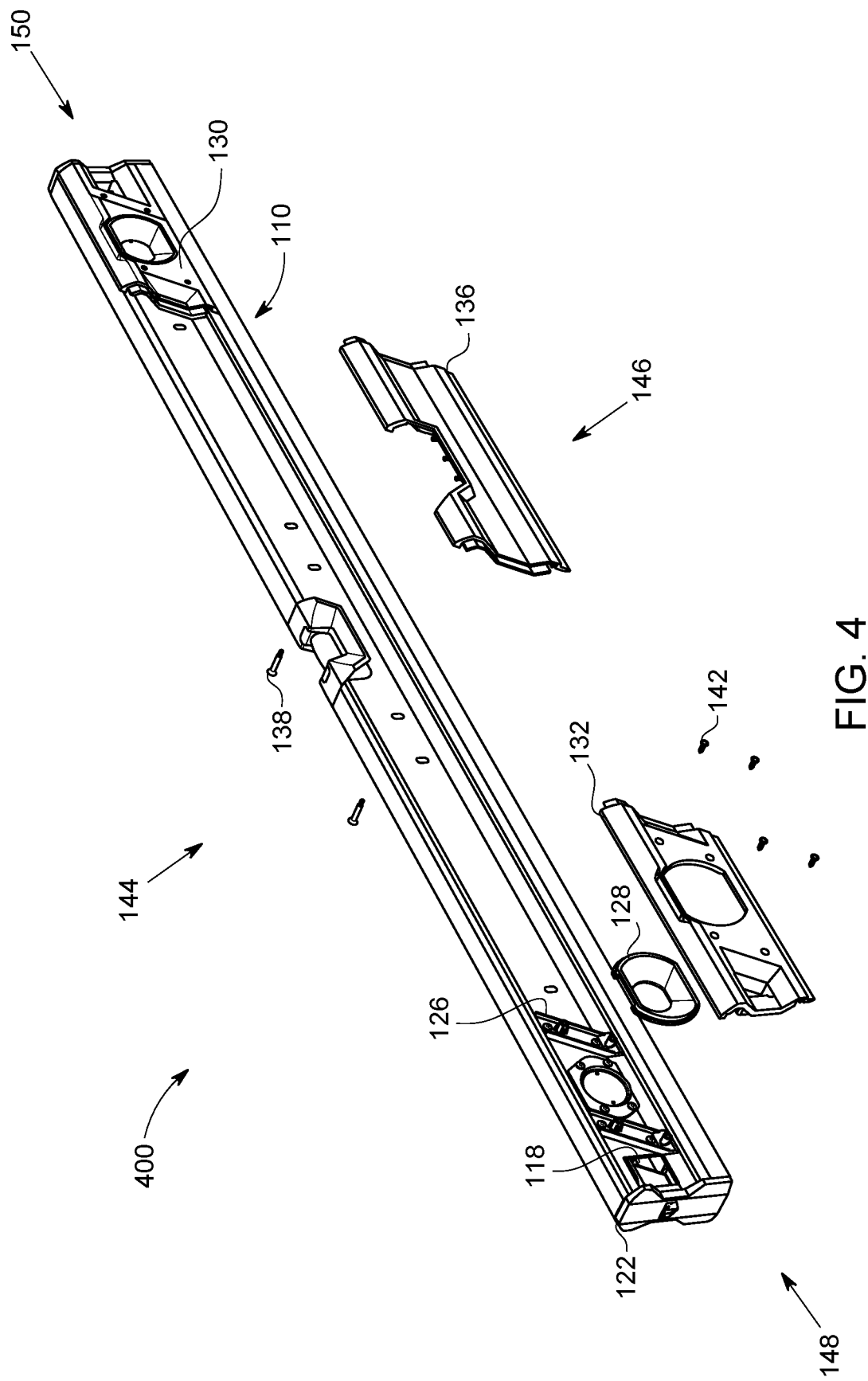
FIG. 4 shows an example masonry level plastic part first assembly view of FIG. 1 masonry level.

FIG. 4 shows the example masonry level plastic part first assembly view of FIG. 1 masonry level. The illustrated masonry level 100 plastic part first assembly view 400 including two sides and middle plastic claddings, further shows the extruded metallic main body 110, the eyelets 118, the endcaps 122, the brackets 126, the bezel covers 128, the right side plastic cladding 130, the left side plastic cladding 132, the center plastic cladding 136, the long screws 138, the short screw 142, the masonry level back side 144, the masonry level front side 146, the masonry level left side 148, and the masonry level right side 150 orientation designation.

The expanded view of the uncoupled left side plastic cladding 132 is shown in line with the bezel cover 128 and the brackets 126 to be all coupled together using the short screws 142. The right-side plastic cladding 130 is shown as coupled to the extruded metallic main body 110.

The center plastic cladding 136 is shown as uncoupled with the extruded metallic main body 110 to be coupled to the masonry level front side 146 of the extruded metallic main body 110 using long screws 138.

As is illustrated by the right side plastic cladding 130 as coupled with the extruded metallic main body 110, it is shown that the bottom part of the right side plastic cladding 130 and consequently the bottom parts of the center plastic cladding 136 and bottom part of the right side plastic cladding 132 will be inserted in the gap between the floating fin 216 and the extruded box main body external lower front straight wall 214 as shown in FIG. 2.

Figure 5:
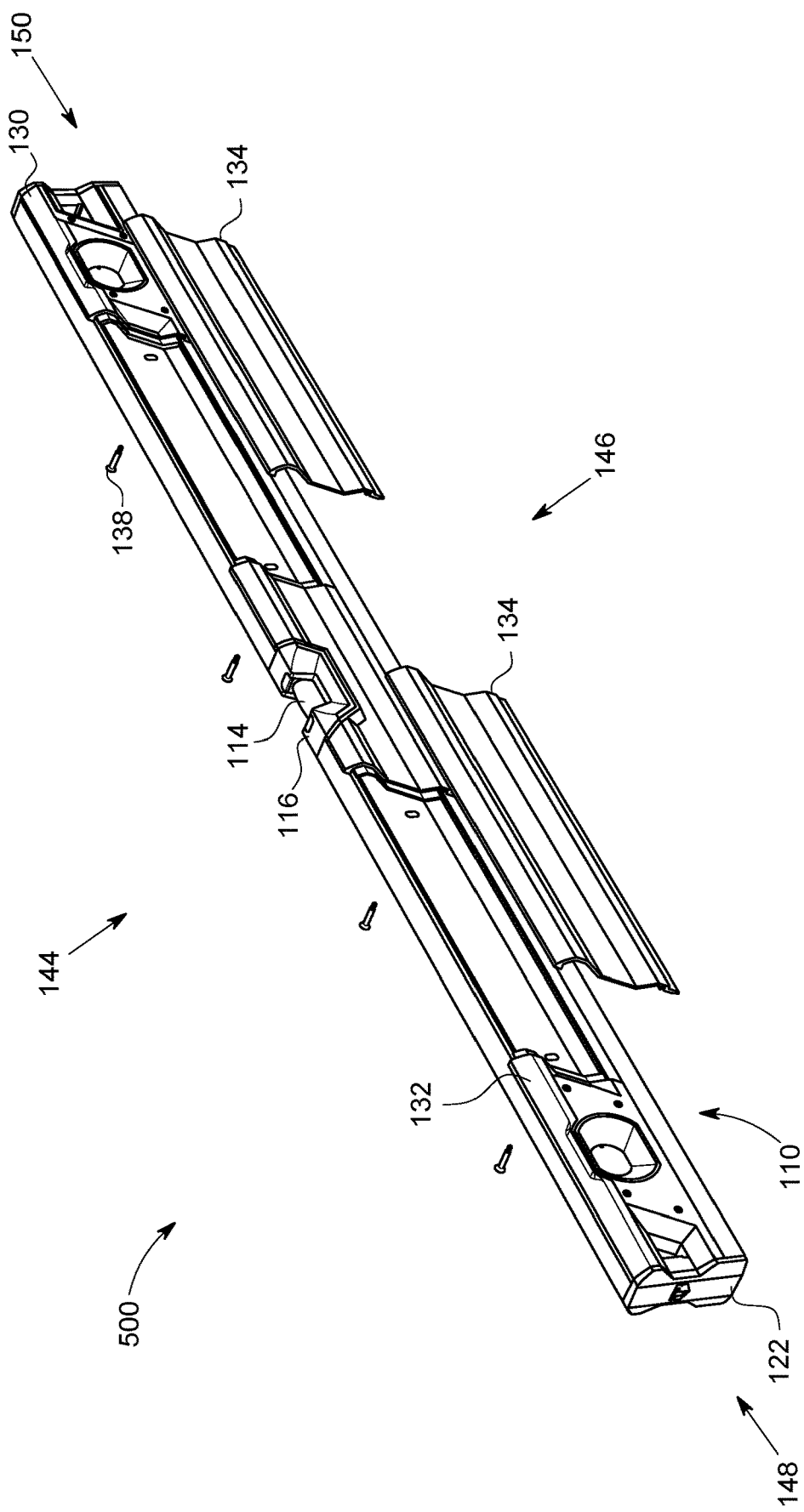
FIG. 5 shows an example masonry level plastic part assembly second view of FIG. 1 masonry level.

FIG. 5 shows the example masonry level plastic part second assembly view of FIG. 1 masonry level. The illustrated masonry level 100 plastic part second assembly view 500 including two intermediate plastic claddings further shows the extruded metallic main body 110, the horizontal bubble vial 114, the horizontal bubble vial upper cover 116, the endcaps 122, the right side plastic cladding 130, the left side plastic cladding 132, the intermediate plastic claddings 134, the long screws 138, the masonry level back side 144, the masonry level front side 146, the masonry level left side 148, and the masonry level right side 150 orientation designation.

The intermediate plastic claddings 134 are shown as uncoupled to the extruded metallic main body 110. The intermediate plastic claddings 134 is set to couple to the extruded metallic main body 110 using the long screws 138. As is illustrated by the right side plastic cladding 130 as coupled with the extruded metallic main body 110, it is shown that the bottom part of the right side plastic cladding 130 and consequently the bottom parts of the intermediate plastic claddings 134 will be inserted in the gap between the floating fin 216 and the extruded box main body external lower front straight wall 214 as shown in FIG. 2.

Figure 6:
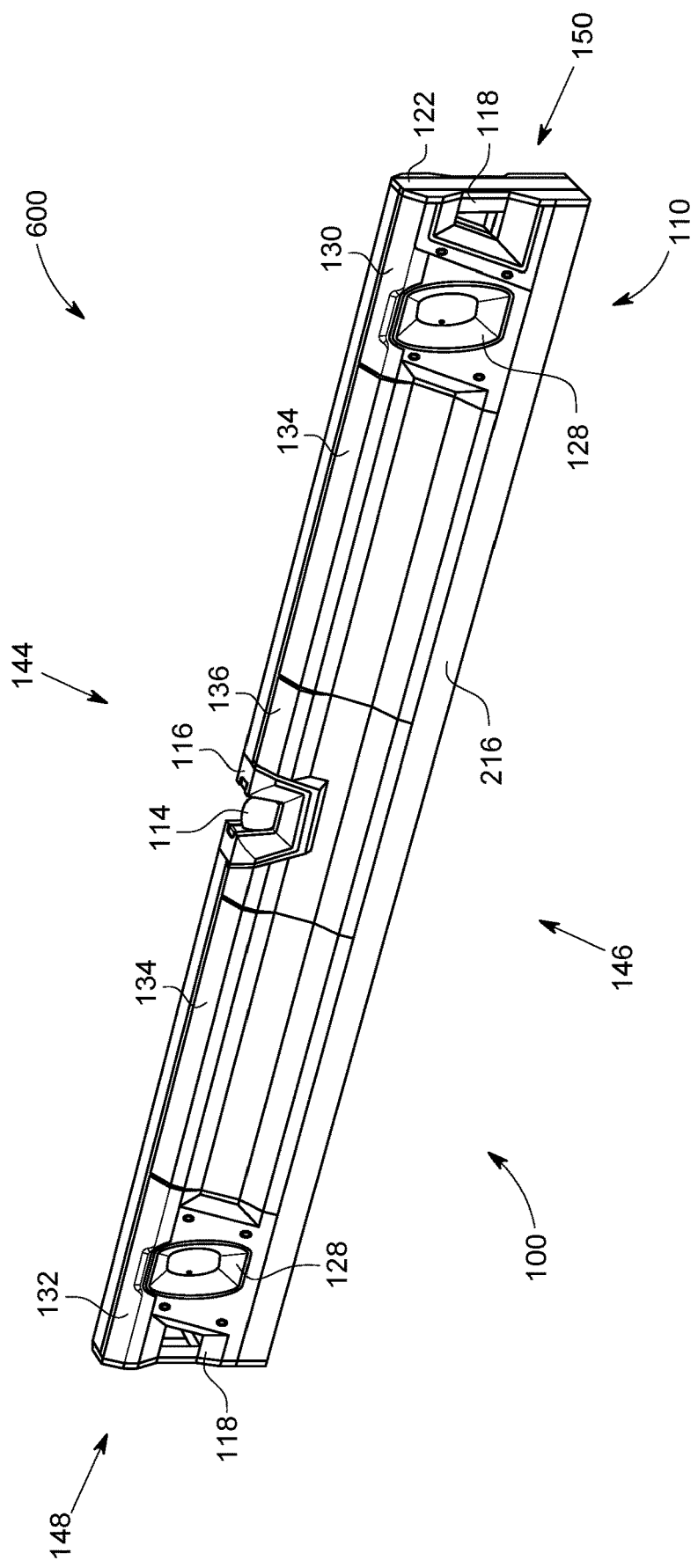
FIG. 6 shows an example masonry level front view of FIG. 1 masonry level.

FIG. 6 shows the example masonry level front view of FIG. 1 masonry level. The illustrated masonry level 100 front view 600 further shows the extruded metallic main body 110, the horizontal bubble vial 114, the horizontal bubble vial upper cover 116, the eyelets 118, the endcaps 122, the bezel covers 128, the right side plastic cladding 130, the left side plastic cladding 132, the intermediate plastic claddings 134, the center plastic cladding 136, the longitudinal floating fin 216, masonry level back side 144, the masonry level front side 146, the masonry level left side 148, and the masonry level right side 150 orientation designation.

The illustrated masonry level front view 600 shows a completed masonry level 100 assembly with all the bubble vials, plastic claddings, eyelets 118, and endcaps 122 coupled to the extruded metallic main body 110. The plastic cladding covered front of the masonry level 100 shows how the plastic covering alleviates adherence of uncured concrete or mud plaster to the extruded main body 110. The plastic claddings also provide a supple, flexible, firm, and comfortable grip for the user of the level, reducing or eliminating slippage of the level from wet or fatigued hands while working. The plastic cladding further enables washing of the masonry level 100 with water after using the level for smoothing uncured concrete or mud plaster to clean the masonry level 100 and remove any construction debris from the level to maintain a smooth external bottom wall of the level to maintain the level's characteristic of making precision orientation measurement of work surfaces.

Figure 7:
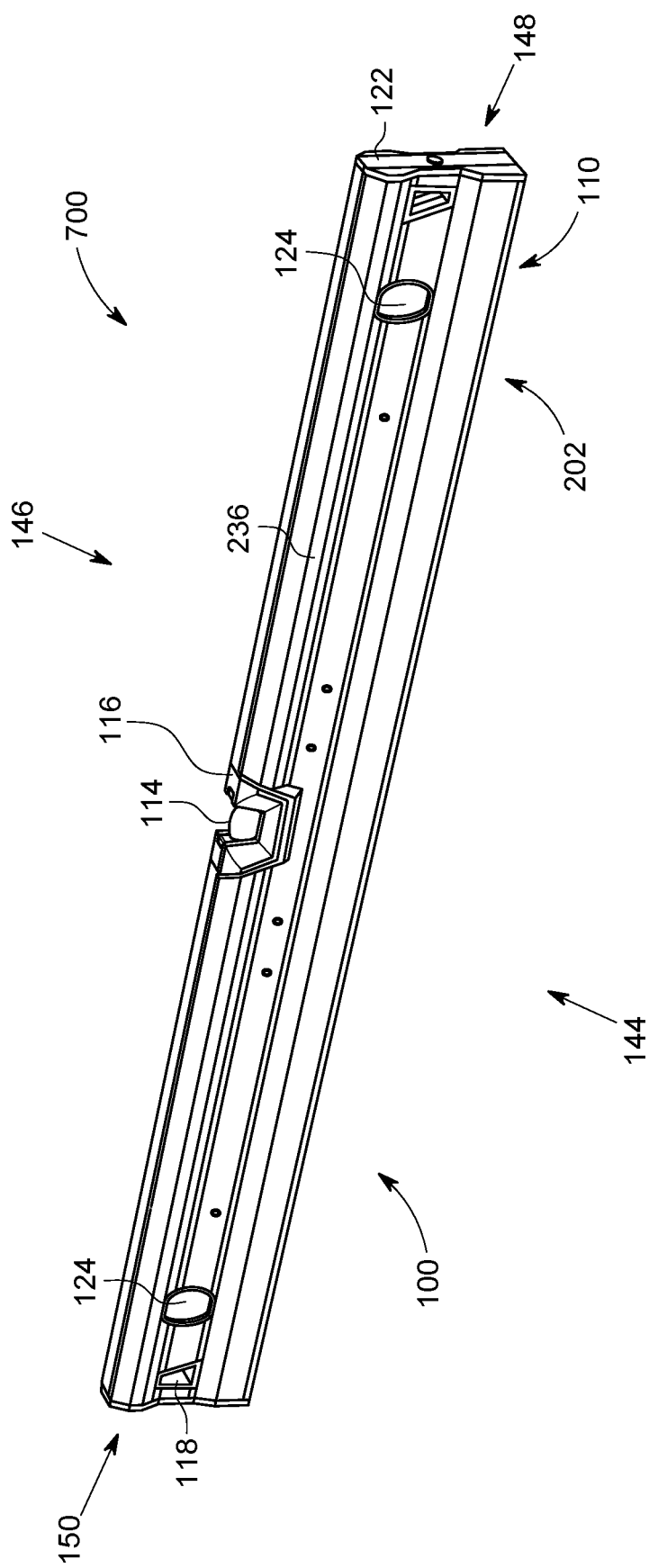
FIG. 7 shows an example masonry level back view of FIG. 1 masonry level.

FIG. 7 shows the example masonry level back view of FIG. 1 masonry level. The illustrated masonry level back view 700 further shows the masonry level 100, the extruded metallic main body 110, the horizontal bubble vial 114, the horizontal bubble vial upper cover 116, the eyelets 118, the endcaps 122, the side bubble vials 124, the extruded box main body external bottom wall 202, the extruded box main body external back side upper convex section 236, the masonry level back side 144, the masonry level front side 146, the masonry level left side 148, and the masonry level right side 150 orientation designation.

The masonry level 100 back view 700 show a completed masonry level 100 assembly with all the bubble vials, eyelets 118, and endcaps 122 coupled to the extruded metallic main body 110. The back view 700 of the masonry level 100 illustrate the upper convex 236 configuration of the extruded main body 110 of the masonry level 100. The convex configuration will assist gripping the masonry level 100 by hand while using the masonry level for construction applications as a construction tool such as a concrete hand float, a concrete spreader, or a concrete screed edge to smooth out uncured concrete surfaces or uncured mud plaster, or a small mallet for impacting bricks to bring a brick in line with the adjacent brick during masonry work or brick laying.

It will be understood that unless explicitly stated or specified, the steps described in a process are not ordered and may not necessarily be performed or occur in the order described or depicted. For example, a step A in a process described prior to a step B in the same process, may actually be performed after step B. In other words, a collection of steps in a process for achieving an end-result may occur in any order unless otherwise stated.

Changes can be made to the claimed invention in light of the above Detailed Description. While the above description details certain embodiments of the invention and describes the best mode contemplated, no matter how detailed the above appears in text, the claimed invention can be practiced in many ways. Details of the system may vary considerably in its implementation details, while still being encompassed by the claimed invention disclosed herein.

Particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the claimed invention to the specific embodiments disclosed in the specification, unless the above Detailed Description section explicitly defines such terms. Accordingly, the actual scope of the claimed invention encompasses not only the disclosed embodiments, but also all equivalent ways of practicing or implementing the claimed invention.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." It is further understood that any phrase of the form "A/B" shall mean any one of "A", "B", "A or B", or "A and B". This construct includes the phrase "and/or" itself.

The above specification, examples, and data provide a complete description of the manufacture and use of the claimed invention. Since many embodiments of the claimed invention can be made without departing from the spirit and scope of the disclosure, the invention resides in the claims hereinafter appended. It is further understood that this disclosure is not limited to the disclosed embodiments, but is intended to cover various arrangements included within the spirit and scope of the broadest interpretation so as to encompass all such modifications and equivalent arrangements.

What is claimed is:

1. A masonry level comprising:
   an extruded metallic box main body, with a longitudinal upper convex back side, a relatively wider bottom wall compared to a narrower top wall;
   a plurality of bubble vials;
   an external longitudinal floating fin being an integral part of a front side of the main body;
   an external tab and hook tab being an integral part of the front side of the main body;
   at least one plastic cladding coupled to the front side of the main body; and
   a plurality of endcaps coupled to the ends of the main body.

2. The masonry level of claim 1, further comprising a plurality of structures for placements of the plurality of bubble vials, including a structure enclosed within an interior space of the main body, having a front side longitudinal midsection indentation to couple to the back side internal longitudinal tab of the main body for placement of a horizontal bubble vial housing structure coupled to a horizontal bubble vial with a press fit upper cover structure; and
   a plurality of side bubble vials, each coupled within apertures on the sides of the main body using rivets, covered by a cover bezel, proximate to a plurality of brackets riveted to the sides of the main body on each side of the side bubble vial enabling a right and a left plastic claddings external coupling to the main body using fasteners over the side bubble vials.

3. The masonry level of claim 1, wherein the at least one plastic cladding further includes:
   a center plastic cladding covering the area of the horizontal bubble vial with an opening to observe the bubble vial;
   a plurality of intermediate plastic claddings coupled to the front side exterior of the main body between the center plastic cladding and a left and a right plastic cladding;
   wherein the side, center, and intermediate plastic claddings are press fit coupled to the main body using a gap between the longitudinal floating fin wall and a main body external lower front straight wall, and the main body external longitudinal tab and hook tab; and
   wherein the floating fin contact edge with the plastic claddings is fillet edge configured.

4. The masonry level of claim 1, further comprising a plurality of eyelets coupled with main body, wherein the plurality of eyelets form a trapezoid-shaped structure enclosing an internal aperture;
   wherein the coupling of the eyelets within side apertures at the ends of the main body is in a reverse format, where a trapezoid base of a first eyelet is substantially parallel with the bottom wall of the main body; and
   the trapezoid base of a second eyelet is substantially parallel with the top wall of the main body.

5. The masonry level of claim 1, wherein the endcaps are plastic and are press fit at open ends of the extruded metallic box main body.

6. The masonry level of claim 1, wherein the main body upper back side longitudinal convex configuration includes:
   an upper slanted curved wall;
   a middle straight wall; and
   a lower slanted wall.

7. The masonry level of claim 1, wherein the main body bottom wall rests on a work surface for orientation measurement; and
wherein the metallic bottom wall has a smooth surface used for smoothing uncured concrete and mud plaster and minor impacting of masonry when laying bricks or stone working.

8. A masonry level, comprising:
an extruded metallic box main body, with an upper back side shaped in a longitudinal convex manner, a relatively wider bottom wall compared to a narrower top wall;
wherein the main body further includes:
an external longitudinal floating fin as part of a lower front side of the main body; and
an external longitudinal tab proximate to a free end of the floating fin, and an external longitudinal hook tab on an upper front side of the main body.

9. The masonry level of claim 8, further including:
a plurality of bubble vials;
a plurality of housing structures for placement of the bubble vials;
a plurality of plastic claddings coupled to the front side of the main body;
a plurality of eyelets coupled to the main body; and
a plurality of endcaps coupled to the ends of the main body.

10. The masonry level of claim 9, wherein the plurality of structures for placements of bubble vials include:
a structure internal to the main body, with a front side longitudinal midsection indentation for coupling with the back side internal longitudinal tab of the main body for placement of a horizontal bubble vial housing structure coupled to a horizontal bubble vial with a press fit upper cover structure; and
a plurality of side bubble vials, each coupled within apertures on the sides of the main body using rivets, covered by a cover bezel, proximate to a plurality of brackets riveted to the sides of the main body on each side of the side bubble vial enabling a right and a left plastic claddings external coupling to the main body using fasteners over the side bubble vials.

11. The masonry level of claim 9, wherein the plurality of plastic claddings further includes:
a center plastic cladding covering the area of the horizontal bubble vial with an opening to observe the bubble vial;
a plurality of intermediate plastic claddings coupled to the front side exterior of the main body between the center plastic cladding and a left and a right plastic cladding;
wherein the side, center, and intermediate plastic claddings are press fit coupled to the main body using a gap between the longitudinal floating fin wall and a main body external lower front straight wall, and the main body external longitudinal tab and hook tab; and
wherein the floating fin contact edge with the plastic claddings is fillet edge configured.

12. The masonry level of claim 9, wherein the eyelets form a trapezoid shaped structure with an internal aperture;
wherein the coupling of the eyelets within side apertures at the ends of the main body is in a reverse format, wherein a trapezoid base of a first eyelet is substantially parallel with the bottom wall of the main body; and
the trapezoid base of a second eyelet is substantially parallel with the top wall of the main body.

13. The masonry level of claim 9, wherein the endcaps are plastic and are press fit at the open ends of the extruded metallic box main body.

14. The masonry level of claim 9, wherein the main body bottom wall rests on a work surface for orientation measurement; and
wherein the metallic bottom wall has a smooth surface used for smoothing uncured concrete and mud plaster and minor impacting of masonry when laying bricks or stone working.

15. A method of making a masonry level, comprising:
making a masonry level comprising a metallic extruded box shape main body with an upper back side convex configuration and a bottom wall's width larger than an top wall's width;
wherein the masonry level includes a plurality of bubble vials;
wherein the masonry level further comprises a plurality of plastic cladding press fit coupled to the front of the masonry level, using a gap between a lower straight side wall of the main body and a longitudinal floating fin at the lower front side of the main body, and an external longitudinal tab protrusion from the main body lower front proximate to the floating end of the floating fin and an external longitudinal hook tab protrusion at an upper end of the main body front side; and
wherein a smooth surface of the masonry level's bottom wall is useable on a work surface to be orientation measured.

16. The method of claim 15, wherein the smooth surface of the masonry level's bottom wall is useable to smooth uncured concrete or mud plaster and to enact minor impacting of masonry when laying bricks or stone working.

17. The method of claim 15, wherein shaping the upper back side of the masonry level as the convex configuration by forming an upper slanted curved wall, a middle straight wall, and a lower slanted wall.

18. The method of claim 15, wherein coupling a horizontal bubble vial with the masonry level, using an internal housing structure with a longitudinal front side indentation coupling to an internal longitudinal tab on a midsection of back side wall of the masonry main body.

19. The method of claim 15, wherein closing the ends of the metallic extruded box shape main body with a plurality of plastic endcaps, preventing introduction of construction debris, uncured concrete and mud plaster into the extruded box shape main body.

20. The method of claim 15, wherein hanging the masonry level form trapezoid shaped eyelets coupled to side apertures at the end of the masonry level between each use of the masonry level;
wherein the coupling of the eyelets within the side apertures at the ends of the main body is in a reverse format, where a trapezoid base of a first eyelet is substantially parallel with the bottom wall of the main body; and
the trapezoid base of a second eyelet is substantially parallel with the top wall of the main body.

* * * * *